(12) United States Patent
Versini (10) Patent No.: US 8,210,097 B2
(45) Date of Patent: Jul. 3, 2012

(54) MACHINE FOR AUTOMATICALLY PREPARING AND DISPENSING BEVERAGES, BY PERFORMING MECHANICAL OPERATIONS ON SPHERICAL CAPSULES

(76) Inventor: Rolland Versini, Marseilles (FR)

( * ) Notice: Subject to any disclaimer, the term of this patent is extended or adjusted under 35 U.S.C. 154(b) by 296 days.

(21) Appl. No.: 12/516,206

(22) PCT Filed: Nov. 27, 2007

(86) PCT No.: PCT/FR2007/001940
§ 371 (c)(1),
(2), (4) Date: May 25, 2009

(87) PCT Pub. No.: WO2008/071877
PCT Pub. Date: Jun. 19, 2008

(65) Prior Publication Data
US 2010/0116142 A1   May 13, 2010

(30) Foreign Application Priority Data

Nov. 28, 2006   (FR) ...................................... 06 10402

(51) Int. Cl.
*A47J 31/40* (2006.01)
(52) U.S. Cl. .......................... 99/295; 99/302 R; 99/302 P
(58) Field of Classification Search ............... 99/295, 99/302 R, 303, 289 R, 302 P
See application file for complete search history.

(56) References Cited

U.S. PATENT DOCUMENTS

| | | | | |
|---|---|---|---|---|
| 2,939,381 | A | * | 6/1960 | McBride ......................... 99/295 |
| 5,826,492 | A | * | 10/1998 | Fond et al. ...................... 99/295 |

(Continued)

FOREIGN PATENT DOCUMENTS

EP   1 295 554 A   3/2003

(Continued)

OTHER PUBLICATIONS

International Search Report, Jul. 11, 2008, from International Phase of the instant application.

(Continued)

*Primary Examiner* — Reginald L Alexander
(74) *Attorney, Agent, or Firm* — Jackson Patent Law Office (57) ABSTRACT

The technical problem of the present invention is to provide a machine for automatically preparing and dispensing beverages that has an infusion chamber of simple design and optimises the infusion of the capsule so that all areas of the latter are subjected to water injection. The solution of the invention is an assembly including a machine for automatically and dispensing beverages that comprises an infusion chamber (11) adapted for receiving a capsule (1) formed by a compacted aggregate of a substance to be infused trapped in an airtight and watertight conditioning envelope, said infusion chamber being provided with a member (12) for puncturing said conditioning envelope, penetrating into said aggregate of substance to be infused and injecting pressurized water into said capsule, said infusion chamber including a puncture area (20) adapted for locally puncturing or piercing said conditioning envelope, said puncture area (20) communicating with a device (21, 21a, 22) for recovering the liquid flowing through the punctured or pierced area of said conditioning envelope, characterized in that the puncture area (20) is located in the infusion chamber (11) on the same side as the puncturing member (12), said puncture area being provided at the base of said puncturing member and connected thereto, the water being injected towards the portion of the capsule (1) opposite said puncture area so as to be evenly distributed into the entire capsule.

16 Claims, 10 Drawing Sheets

U.S. PATENT DOCUMENTS

| | | | |
|---|---|---|---|
| 5,897,899 A * | 4/1999 | Fond | 426/112 |
| 6,595,106 B2 * | 7/2003 | Eugster | 99/289 R |
| 6,644,173 B2 * | 11/2003 | Lazaris et al. | 99/295 |
| 7,063,238 B2 * | 6/2006 | Hale | 222/325 |
| 7,231,869 B2 * | 6/2007 | Halliday et al. | 99/289 R |
| 7,531,198 B2 * | 5/2009 | Cortese | 426/433 |
| 2006/0196364 A1 | 9/2006 | Kirschner | |

FOREIGN PATENT DOCUMENTS

| | | |
|---|---|---|
| EP | 1 510 160 A | 3/2005 |
| FR | 2 879 175 A | 6/2006 |
| GB | 2 416 480 A | 2/2006 |
| WO | WO 2006/003115 A | 1/2006 |

OTHER PUBLICATIONS

English Translation of the Written Opinion of the International Search Authority, Jun. 9, 2009, from International Phase of the instant application.

English Translation of International Preliminary Report on Patentability Chapter I, Jun. 10, 2009, from International Phase of the instant application.

* cited by examiner

Fig.7b

MACHINE FOR AUTOMATICALLY PREPARING AND DISPENSING BEVERAGES, BY PERFORMING MECHANICAL OPERATIONS ON SPHERICAL CAPSULES

TECHNICAL FIELD OF THE INVENTION

An object of the present invention is a machine for automatically preparing and dispensing beverages.

The invention relates to the general technical field of machines enabling infusion of disposable capsules for the preparation of beverages, preferably, but not exclusively, for the preparation of coffee, and whose content to be infused remains in the package. It relates more particularly to the technical field of machines enabling infusion of capsules by injection of pressurized water into the interior of the aforementioned capsule.

A "capsule" is to be differentiated from a "pod" of the type described in the document FR 2,879,175 (Luciani). The capsule has a packaging envelope that serves as an infusion chamber. In contrast, a pod is used only to convey a predetermined amount of substance to be infused into an infusion chamber specific to the machine. In the case where the pod comprises a packaging envelope, it only serves to protect the substance to be infused and must first be torn to remove the aforementioned pod.

STATE OF THE ART

Disposable pods and capsules are well known from the prior art and described in particular in the documents WO 2004/006740 (SEB), WO 94/01344 (Nestle), U.S. 2004/0197444 (Kraft Foods), U.S. Pat. No. 5,012,629 (Kraft Foods), WO 2004/087529 (Hausbrandt), EP 1,221,418 (Melitta Haushaltsprodukte), EP 1,295,554 (SGL Italia) and EP 0,583,210 (Fornari).

Sealed capsules adapted to be opened by the pressure of the injected water are particularly advantageous because they enable attainment of high-quality beverages. Known in particular, from the document EP 0,554,469 (Nestle), is a capsule designed to be used in an machine for automatic beverage preparation, the aforementioned capsule being formed by a compacted aggregate of a substance to be infused held in an packaging envelope impermeable to air and water and having the shape of a cone frustum. In addition to hygienic reasons, using an air and water impermeable packaging envelope provides the advantage of being able to store the capsules for a relatively long period without any degradation of the flavor and aromas of the beverage. A feature of this capsule is that the packaging envelope is configured to burst at the time of the injection of pressurized water into the aforementioned capsule. Generally, the packaging envelope bursts only in a weakness zone provided at the base of the cone frustum.

Known, from the documents EP 0,242,556 (Nestle), EP 1,295,554 (SGL Italia) and U.S. 2002/0023543 (Schmed), are machines for automatic preparation and dispensing of beverages, comprising an infusion chamber configured to receive a capsule of the type described in the document EP 0,554,469 (Nestle). The infusion chamber is equipped with an element for piercing the packaging envelope of the capsule, to penetrate into the aforementioned aggregate of the substance to be infused, and to inject pressurized water into it. The infusion chamber comprises a puncturing zone configured to locally puncture or pierce the packaging envelope, the aforementioned puncturing zone communicating with a device for recovering the liquid flowing through the pierced or punctured part of the aforementioned packaging envelope.

In these known machines of the prior art, the puncturing zone is arranged opposing the piercing element. The capsule is thus pierced at one of its ends and punctured at its other opposite end. The infusion chamber thus has two independent zones, one for injecting pressurized water and another for recovery and evacuation of the beverage. It follows that implementing the infusion chamber is technically complex.

In addition, the pressurized water traverses across the capsule, from the end of the piercing element, to the pierced or punctured part of the packaging envelope. In practice, one can observe that certain zones of the capsule are not subjected to the water injection. The infusion of the capsule is thus not optimal.

Also, because of its shape and design, a capsule of the type described in the document EP 0,554,469 (Nestle) must be placed in the infusion chamber in a specific position. In fact, the infusion is performed by a piercing device configured to pierce the top of the cone frustum and to inject pressurized water. Under the effect of the pressure, the weakness zone arranged at the base of the cone frustum bursts and the water is infused through the capsule toward a recovery conduit for the infused substance.

The major disadvantage of this type of capsules is that they must be positioned so that the top of the cone frustum is opposing the piercing device and that the weakness zone at the base of cone frustum is opposing the recovery conduit for the infused substance, at the risk of damaging the machine. Therefore, it is necessary to provide means to impose the positioning of the capsule in the infusion chamber. The design of the machine becomes complex and it is not possible to provide a machine equipped with a reservoir where the capsules would be stored in bulk and automatically conveyed to the infusion chamber.

To date, because of this state of affairs, machines using such capsules cannot automatically dispense multiple beverages consecutively, making them unusable in bar trades, groups, businesses, or in all other places where a large number of beverages must be prepared daily. In fact, each capsule must be manually positioned in the infusion chamber.

In view of the disadvantages of the prior art, the main technical problem that the invention aims to resolve is to provide a machine for the automatic preparation and dispensing of beverages of the type described above but whose infusion chamber has a simpler design and enables optimization of the infusion of the capsule so that no zone of the latter can not be subjected to the injection of water.

Another goal of the invention is to provide a machine capable of preparing a beverage irrespective of the position of the capsule in the infusion chamber.

Yet another goal of the invention is to provide a machine, for the preparation and dispensing of beverages, having simple design, inexpensive, easy to use and suitable for both personal use and professional use where a large number of beverages must be made daily.

DISCLOSURE OF THE INVENTION

The solution provided by the invention is a machine of the type described in documents EP 0,242,556 (Nestle), EP 1,295,554 (SGL Italia) and U.S. 2002/0023543 (Schmed), whose puncturing zone is arranged in the infusion chamber on the same side as the element for piercing and injecting pressurized water into the interior of the capsule. The puncturing zone is arranged at the base of the piercing element, joined to it. It follows that the infusion chamber is simpler to design and that its size can be reduced relative to the infusion chambers known from the prior art.

In addition, water is injected into the part of the capsule opposed to the puncturing zone so as to be uniformly distributed throughout the aforementioned capsule. The infusion is thus optimized because no zone of the capsule can not be subjected to the water injection.

The document FR 2,879,175 (Luciani) describes a conventional automatic machine for preparation and dispensing of beverages comprising an infusion chamber and two pistons:

- a first piston to pack the portion of ground coffee conveyed by the pod and injected with the water on the aforementioned portion
- and, opposed to the first piston, a second piston for the infusion of the beverage.

The pod is crushed by the packing piston in the infusion chamber so as to form a cake of coffee that will be infused. The infusion is performed in the interior of the infusion chamber and not in the interior of the pod because the latter is literally shattered by the piston.

The hot water is dispensed by the first piston, and then goes through the portion of coffee (shattered pod). The infused beverage is then recovered by the second piston.

The machine described in document FR 2,879,175 (Luciani) is not configured to receive a capsule of the type described in document EP 0,554,469 (Nestle), the infusion chamber having no element for piercing the aforementioned capsule and injecting pressurized water into it. In addition, no zone enabling local piercing or puncturing of the capsule is provided.

PRESENTATION OF THE DRAWINGS

Other advantages and features of the invention will better appear upon reading the description of a preferred implementation mode that will follow, in reference to the attached drawings, made by way of guiding non-limiting examples and in which:

FIG. 6 is a front view of the piercing element, shown in FIG. 5, alone, FIGS. 7a and 7b schematically show different operating positions of the machine according to a second implementation mode, the infusion chamber being adapted to receive another type of capsule.

IMPLEMENTATION MODES OF THE INVENTION

The capsule 1 in accordance with the invention is designed to be used in a machine for automatic preparation and dispensing of a beverage of the type comprising a device to pierce the aforementioned capsule and to inject pressurized water into it. Such machines are for example described in the documents EP 0,242,556 (Nestle) or EP 1,295,554 (SGL Italia).

Figure 1:
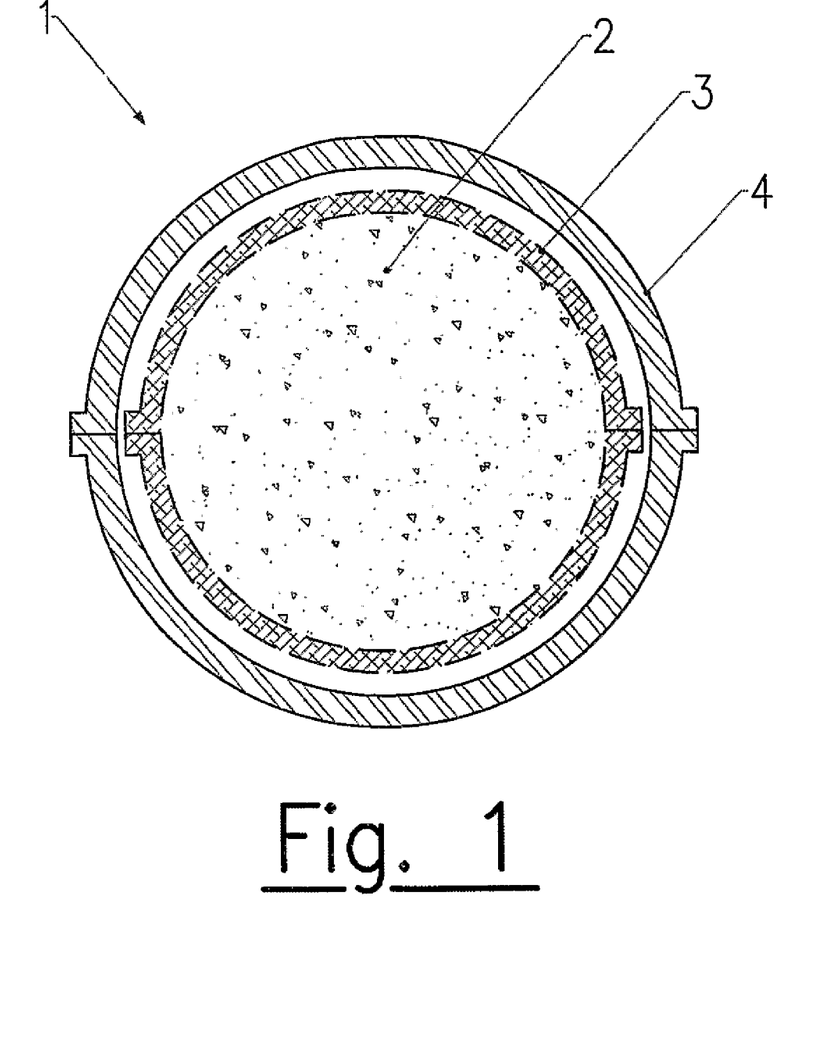
FIG. 1 is a schematic sectional view of a capsule in accordance with the invention, FIGS. 2a to 2e schematically show a first implementation mode of the machine object of the invention in different operating positions.

Referring to FIG. 1, the capsule 1 is formed by a compacted aggregate of a substance to be infused 2 held in a filtering envelope 3 and an external packaging envelope 4. The presence of the filtering envelope 3 is not essential to the operation of the capsule. The substance to be infused 2 is preferably coffee, but can be tea, milk powder, chocolate powder, soup, etc.

Referring to FIG. 1, the filtering envelope 3 is positioned between the compacted aggregate of the substance to be infused 2 and the packaging envelope 4. This filtering envelope 3 enables filtering of the substance to be infused 2 irrespective of the positioning of the capsule 1 in the infusion chamber of the machine and irrespective of the punctured part of the capsule. In addition, the filtering envelope 3 can act as a barrier against certain chemical attacks caused by the material constituting the packaging envelope 4.

The filtering envelope 3 is advantageously constituted by a porous woven or non-woven material, comprising natural and/or synthetic fibers. For example filtering paper or fabric of the type employed in the manufacture of tea bags can be employed.

The volume of the capsule 1 depends on the machine and the substance to be infused 2. In practice, when it contains coffee, the diameter of the capsule 1 is advantageously between 20 mm and 40 mm. It contains preferably between 5 g and 15 g of coffee packed in order to have a density of between 0.6 and 0.75 kg/dm$^3$.

In accordance with the invention, the packaging envelope 4 is air and water impermeable and has a substantially spherical external shape and can be pierced on substantially any part of its surface. Preferably, the packaging envelope 4 is configured to burst under the effect of pressure on substantially any part of its surface at the time of the injection of water into the capsule 1. The result attained is that the capsule 1 can be pierced by the piercing device of the machine and can burst irrespective of its position in the infusion chamber. A similar result can be obtained with a capsule whose packaging envelope 4 has a substantially cubic external shape.

By "substantially", it is meant the fact that certain parts of the capsule such as the zone reserved for a trademark, or, as described below, the sealing zones of the two half-shells constituting the aforementioned capsule cannot be fully pierced or burst because of possible double thicknesses.

The packaging envelope 4 is advantageously made of aluminum, from 20 μm to 120 μm thick. However, other air and water impermeable materials can be used such as flexible or rigid plastics of the polypropylene, polyvinyl chloride, polyethylene, food-grade plastic, etc., type. When the packaging envelope 4 is made of aluminum, it is advantageous to provide a membrane of food-grade film arranged on the inner surface of the aforementioned envelope so as to protect the substance to be infused against possible chemical attacks.

In another implementation variant, a spherical pod made of filtering paper dipped in a bath of food-grade rubber can be used initially. In this way, while maintaining the spherical shape, a layer of food-grade rubber is added around the layer of filtering paper. This layer of rubber forms, after drying, the air and water impermeable packaging envelope in order to obtain a capsule in accordance with the invention.

In practice, the puncture of the capsule 1 is carried out by the action of the injection pressure at a puncturing zone arranged in the infusion chamber of the machine. The capsules known from the prior art, and in particular those described in document EP 0,554,469 (Nestle), comprise a packaging envelope that bursts only at a weakness zone specifically provided on the surface of the aforementioned envelope. The capsule object of the invention is distinguished by the fact that its packaging envelope is configured to be burst on substantially any part of its surface when water is injected into the aforementioned capsule under a pressure of 5 to 20 bar.

The pressure at which the beverage is infused determines its quality. In practice, the higher the pressure, the higher the quality of the infused beverage. It is possible to vary the thickness of the packaging envelope for 4 in order to obtain different types of capsules associated with different qualities of beverage.

For example a first type of capsule can be provided, having a thin (20 μm for example) packaging envelope designed to burst under low pressure (5 bar for example) and able to produce a beverage of suitable quality. For example a coffee-based beverage of the type for American breakfast will be obtained, i.e. whose coffee is much less processed than espresso but retaining the technique known as "espresso".

A second type of capsule can also be provided, having an intermediate thickness (50 μm for example) packaging envelope designed to burst under moderate pressure (10 bar for example) and able to produce a beverage of superior quality, of the "French espresso" type.

Finally, a third type of capsule can also be provided, having a thick (120 μm for example) packaging envelope designed to burst under high pressure (20 bar for example) and able to produce a high quality beverage, with a highly processed coffee, of the "Italian espresso" type (stronger than "French espresso").

The manufacturing process of the spherical capsule 1 is well known to the person of skill in the art and described for example in document FR 2,879,175 (Luciani).

The filtering envelope 3 is advantageously formed by two half-envelopes of filtering material sealed to one another along their peripheral edge so that they cannot burst at the time of the injection of pressurized water into the aforementioned capsule. Similarly, the packaging envelope 4 is advantageously formed by two half-envelopes of air and water impermeable material sealed to one another along their peripheral edge so that they can be punctured and possibly burst at the time of the injection of pressurized water into the aforementioned capsule. In an implementation variation, the two half-envelopes of the packaging envelope 4 are fused to one another by ultrasound. In another implementation variation, they are sealed to one another by insertion and snap-fit of their edge on one another in the same way as certain hard gelatin medicine capsules.

The process for preparing a beverage from the capsule 1 previously described is then very simple. It suffices to pierce the packaging envelope 4 of the capsule 1 and inject pressurized water into the interior of the aforementioned capsule in order to infuse the substance 2 contained in the latter. It then recovers the beverage flowing through the part of the packaging envelope 4 that was punctured under the effect of the injection pressure of the water or that was previously pierced.

An implementation mode of a machine enabling implementation of this process will now be described in more detail referring to FIGS. 2a to 2e and FIGS. 3 to 6.

Referring to FIGS. 2a to 2e, the machine 10 comprises an infusion chamber 11 configured to receive a spherical capsule 1 of the type described above. Spherical capsules having a packaging envelope 4 that is not adapted to burst at the time of the injection of the pressurized water can also be used. This implementation mode is particularly explained later in the description and in FIG. 5.

The infusion chamber 11 is equipped with an element 12 to pierce the packaging envelope 4 of the capsule 1 and inject pressurized water into the latter.

A reservoir 13 containing multiple capsules 1 in bulk can be fitted in order to communicate with the infusion chamber 11.

According to a preferred implementation mode, the infusion chamber 11 is formed by yokes 11a, 11b moveably mounted in the housing 100 of the machine 10, between:
  a loading position (FIG. 2a) enabling the placement of the capsule 1 in the infusion chamber 11,
  and a closed position (FIG. 2c) where the yokes 11a, 11b are mutually positioned in order to hold the capsule 1.

The yokes 11a, 11b are advantageously obtained by plastic molding, but any other material and process convenient for the person of skill in the art can be employed.

To simplify the design, a front yoke 11a and a rear yoke 11b are provided, moveably mounted in translation in the housing 100. As shown on the attached figures, the yokes 11a and 11b have substantially hemispherical ends fitted to the shape and dimensions of the spherical capsule 1.

A sealing device is advantageously, but not necessarily, provided between the yokes 11a, 11b, so that the infusion chamber 11 is completely sealed at the time of the infusion step.

The rear yoke 11b advantageously comprises a series of notches 14 on its exterior surface that are meshed with a toothed wheel 15 fixed to the frame 100. The toothed wheel 15 is coupled to an actuating arm 16. The toothed wheel 15 and the series of notches 14 are arranged so that the rotation of the aforementioned wheel causes translation of the rear yoke 11b. However, the rear yoke can be moved by any other mechanical device convenient for the person of skill in the art, such as a cylinder, drive belt system, screw/nut system, etc.

When the yokes 11a and 11b are in closed position, the toothed wheel 15 is advantageously blocked in a lock position in order to avoid movement of the rear yoke 11b at the time of the injection of pressurized water into the capsule 1. The locking mechanism can include an eccentric, a detent element, or any other equivalent means convenient for the person of skill in the art.

Figure 2A:
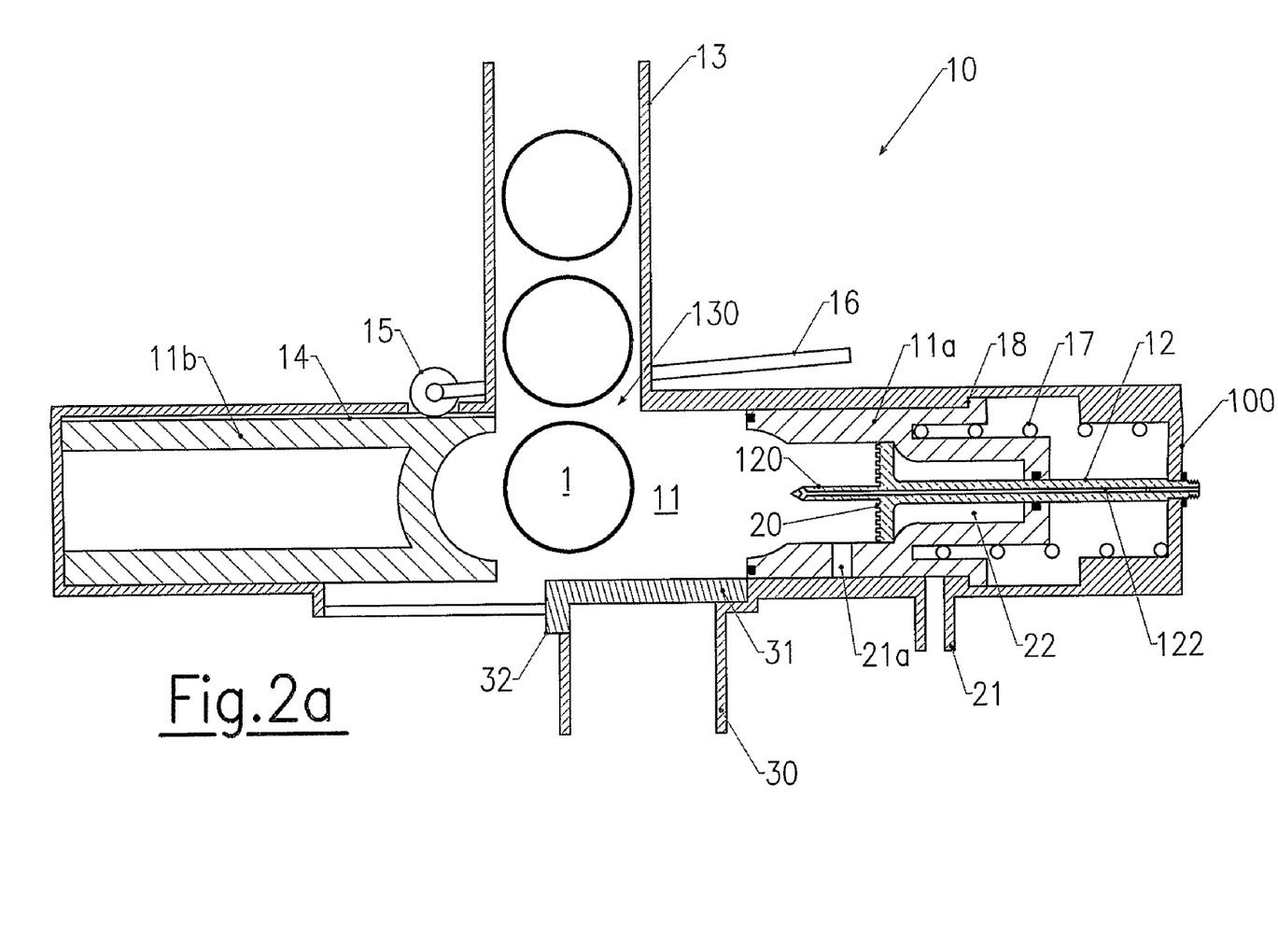
Figure 2B:
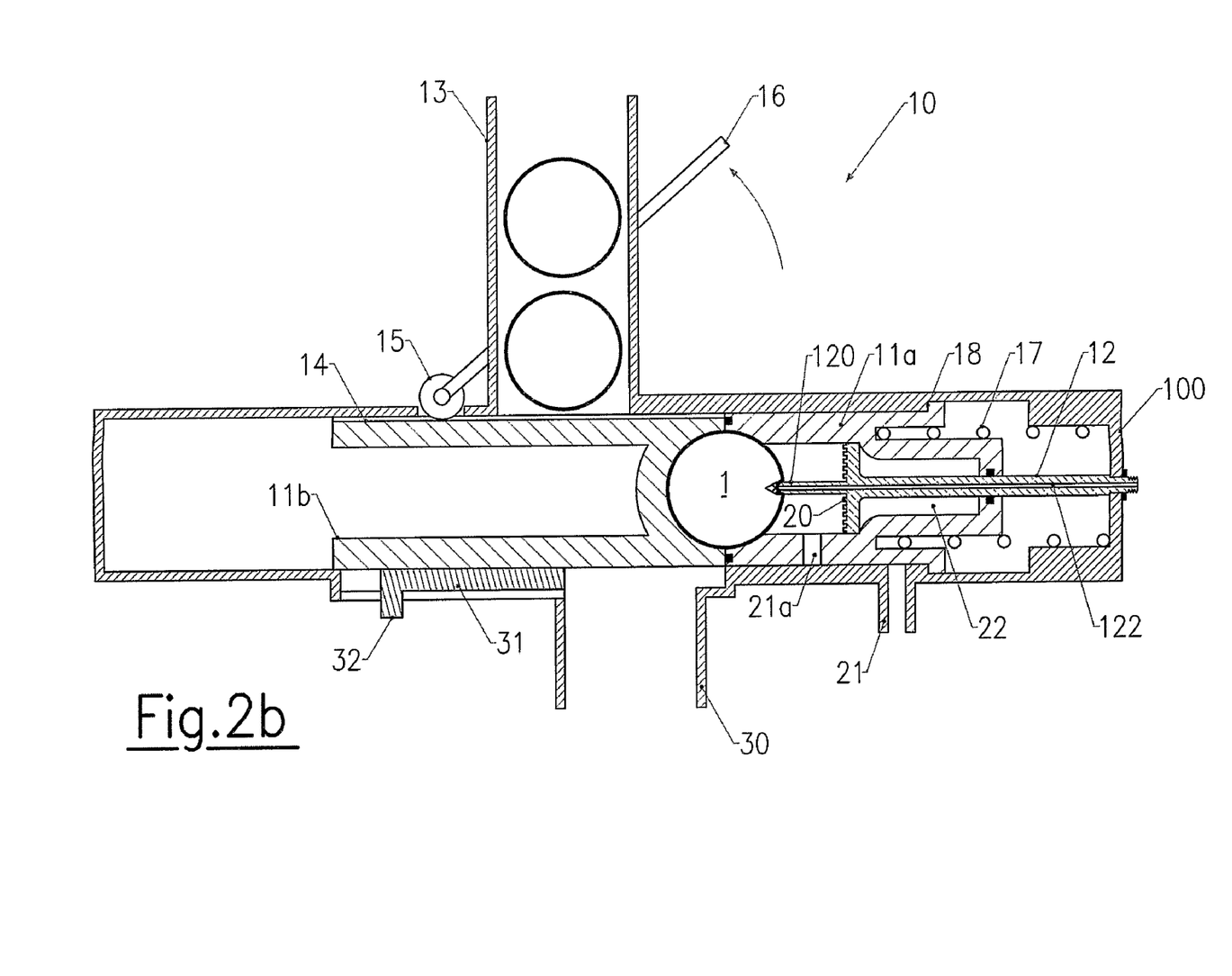
Figure 2C:
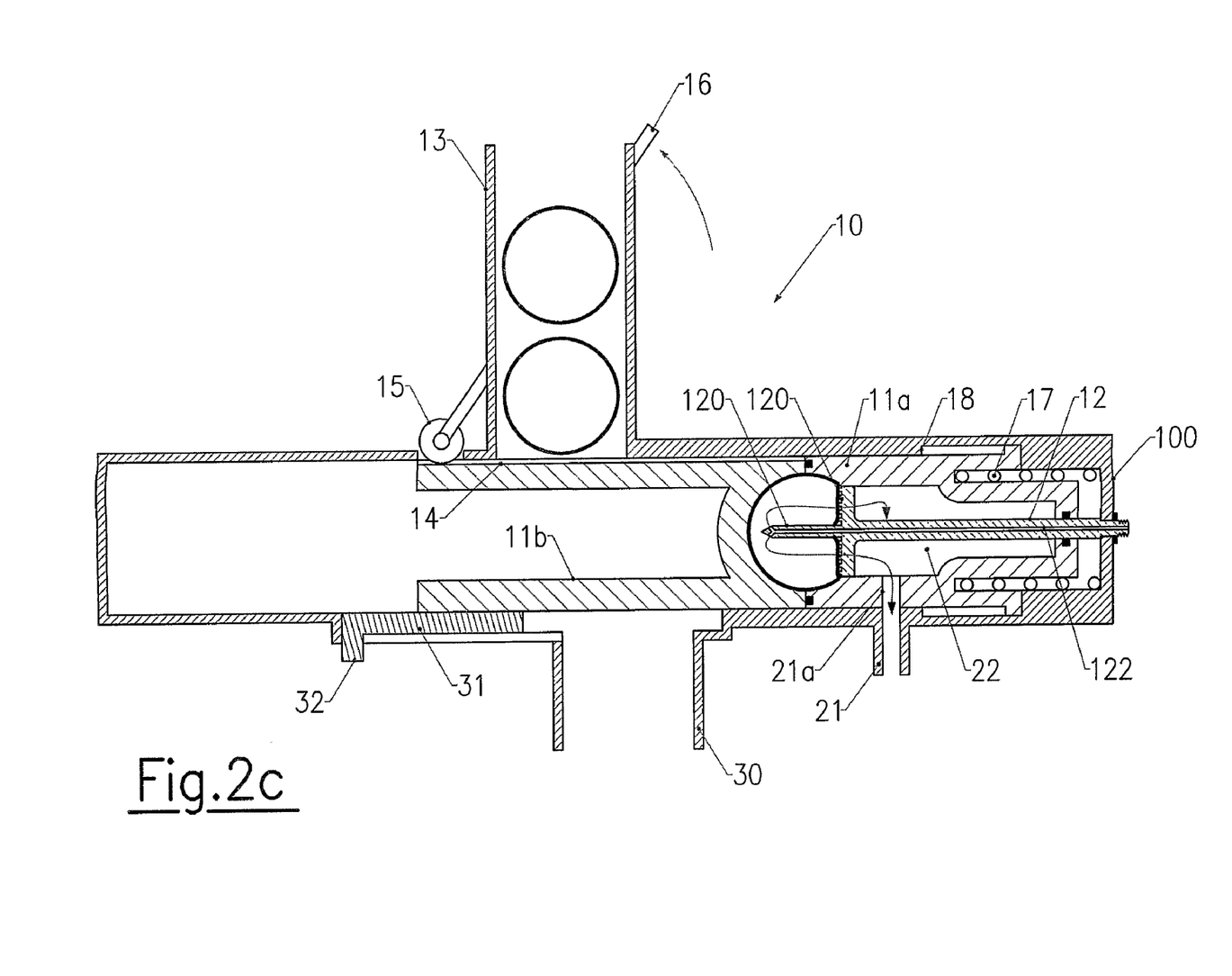

The front yoke 11a is also moveably mounted in translation in the housing 100, although this is not essential for the functioning of the machine 10. The front yoke 11a is moveably mounted between a forward position and a retracted position. At rest (FIG. 2a), a compression spring 17 comes to push the front yoke 11a against a stop 18 arranged in the interior of the frame 100. When the rear yoke 11b comes into contact with the front yoke 11a and continues to advance, the spring 17 compresses and the aforementioned rear yoke retracts (FIG. 2c) until butting against the end of the frame 100. When the rear yoke 11b retracts, the compression spring 17 relaxes and returns naturally to push the front yoke 11a against the stop 18 (FIG. 2e).

The piercing element 12 is advantageously joined to the frame 100 of the machine 10. According to a preferred implementation mode shown in FIGS. 2a to 2e and more particularly in FIGS. 3 and 5, the piercing element 12 is arranged with the front yoke 11a. It comprises at one of its ends a needle 120 designed to penetrate into the capsule 1. The tip of the needle 120 is equipped with water injection orifices 121 coupled to a conduit for the pressurized water 122. The other end of the piercing element 12 is configured to be coupled to a hot water source. At the time of the infusion, the hot water is pressurized by a pump coupled to a water reservoir.

Figure 3:
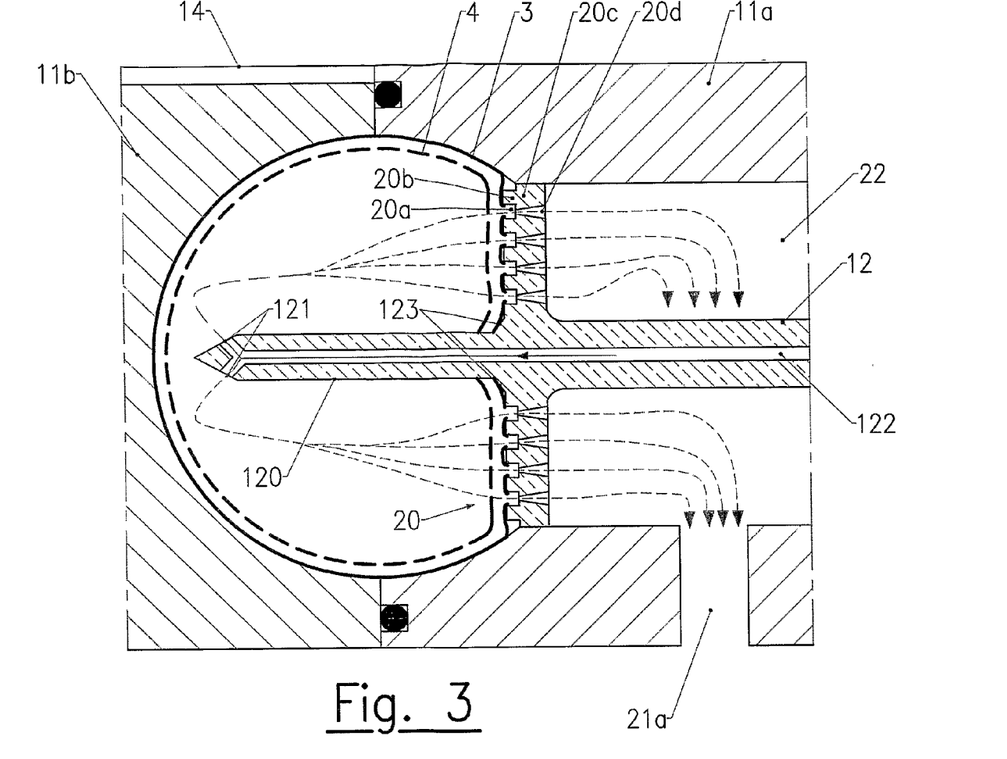
FIG. 3 is a schematic enlarged view of the infusion chamber of the machine shown in FIGS. 2a to 2e.
Figure 5:
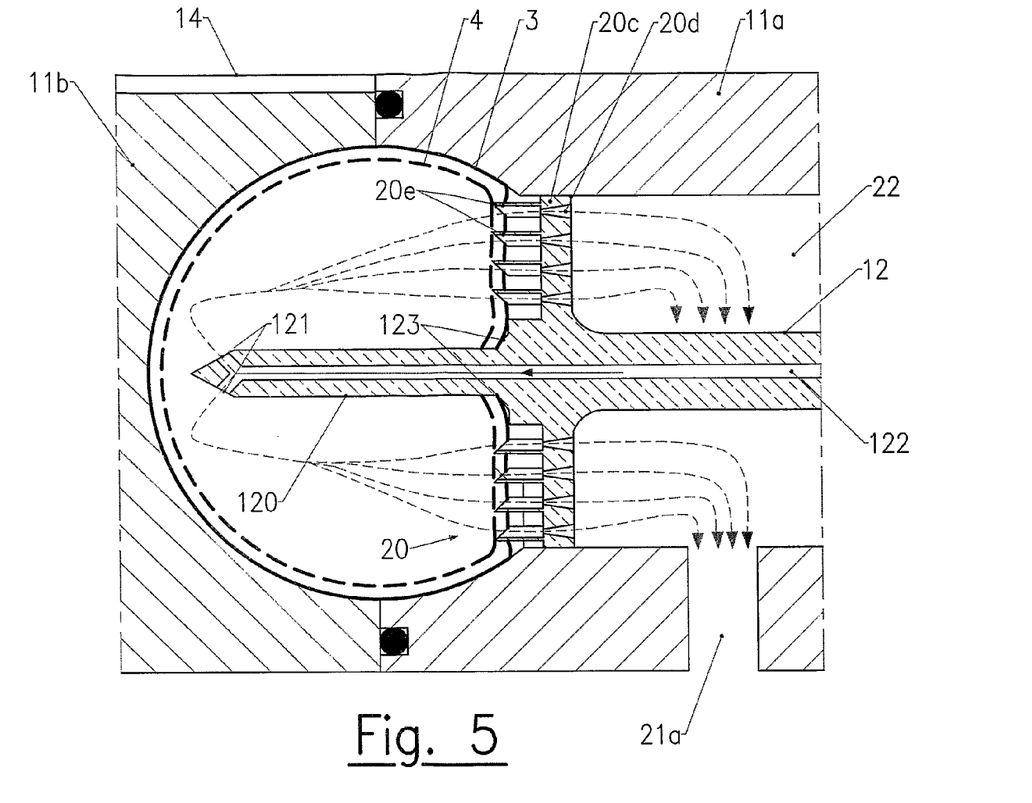
FIG. 5 is a schematic enlarged view of the infusion chamber in an implementation variation of the machine shown in FIGS. 2a to 2e.

The orifices 121 are positioned in order to provide a diffuse and uniform injection of water into the substance to be infused 2. Referring more particularly to FIGS. 3 and 5, the water is injected into the part of the capsule 1 opposed to the puncturing zone 20 in order to be able to be distributed uniformly throughout the aforementioned capsule. No zone of the capsule 1 will not be subjected to the injection of pressurized water.

Referring more particularly to FIGS. 3 and 5, the length of the needle 120 is such that it can pierce only one side of the capsule 1.

Figure 2D:
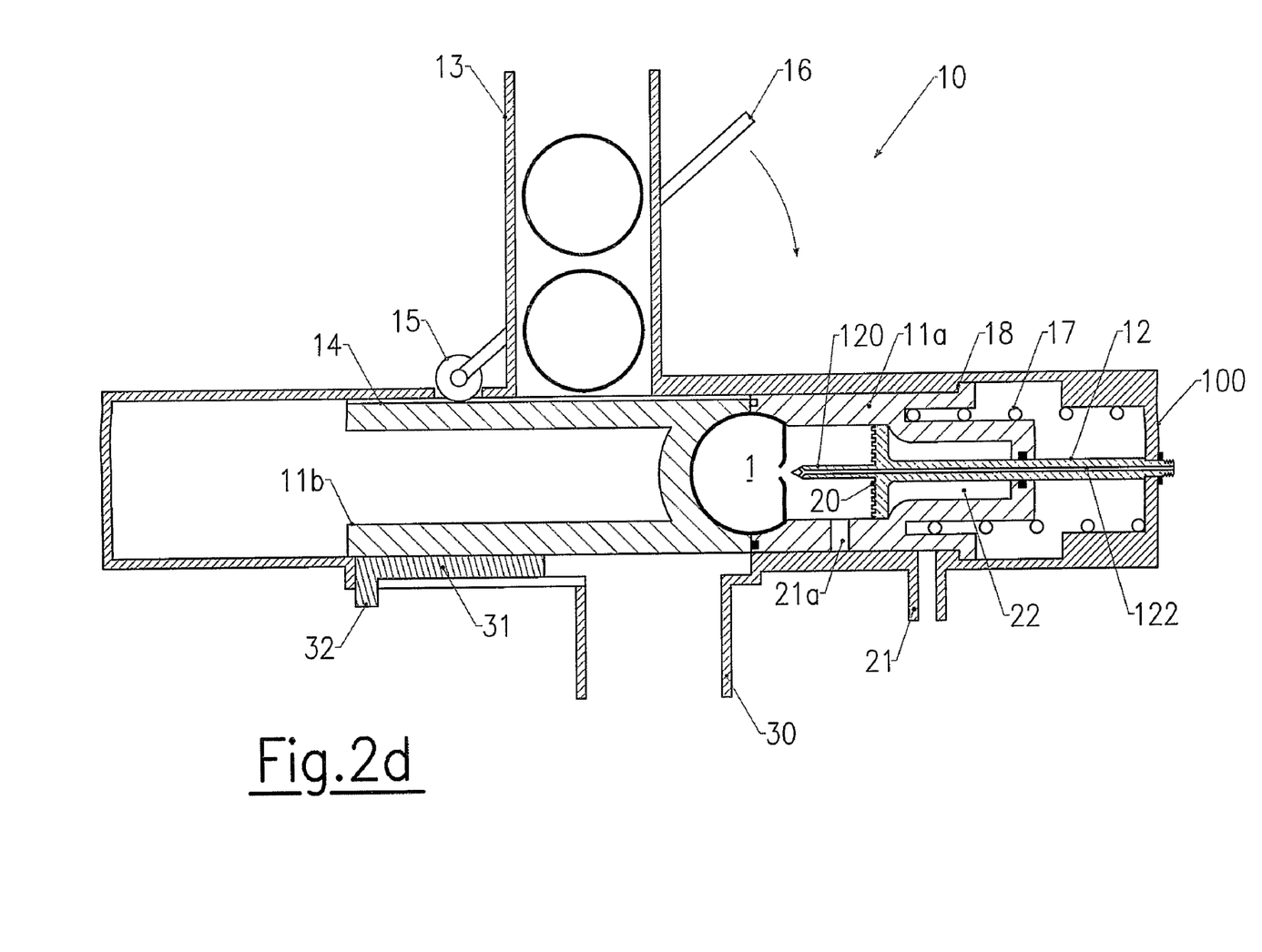
Figure 2E:
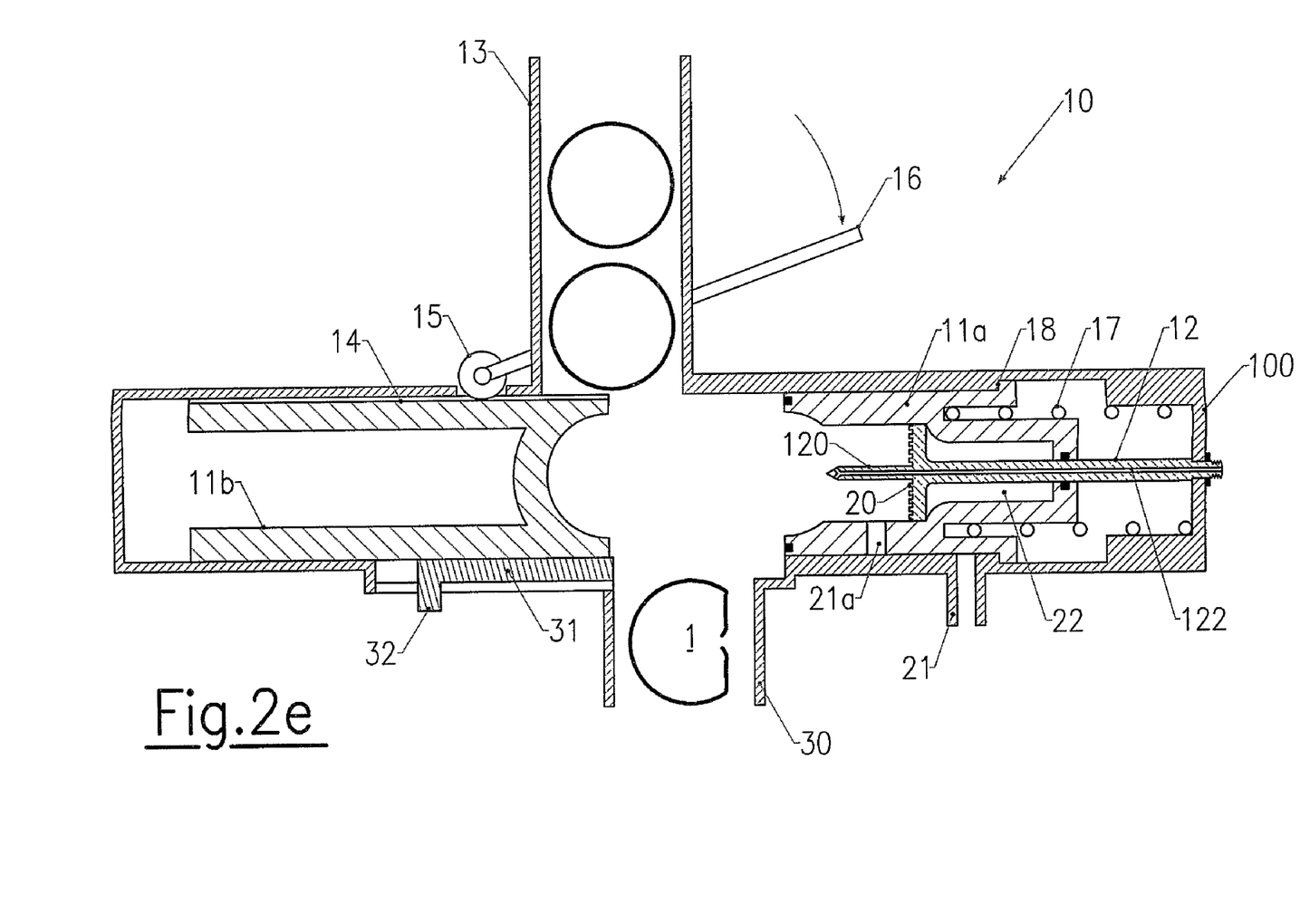

The front yoke 11a and the piercing element 12 are arranged so that:
in retracted position, the front yoke 11a enables the skewering of the capsule 1 on the needle 120 (FIG. 2c),
and in forward position, the front yoke 11a enables the extraction of the capsule 1 away from the needle 120 (FIG. 2d).

In fact, in forward position, the front yoke 11a tends to push the capsule 1 away from the needle 120.

A similar result would be obtained by providing a front yoke mounted in a fixed manner in the frame 100 and a piercing element 12 moveably mounted between a forward position where the needle 120 skewers the capsule 1 and a retracted position where it comes out of the capsule.

A seal is advantageously provided between the front yoke 11a and the piercing element 12.

The internal surface of the infusion chamber 11 is arranged so that at the time of the injection of pressurized water into the capsule 1, the packaging envelope 4 of the aforementioned capsule cannot be pierced or burst except at a puncturing zone 20 specially provided for this purpose. The puncturing zone 20 is configured in order to communicate with a device to recover the liquid flowing through the pierced or punctured part of the packaging envelope 4. The other parts of the inner surface of the infusion chamber 11 are smooth and fitted to the dimensions of the capsule 1, so that the packaging envelope 4 can only be punctured or burst in the puncturing zone 20.

According to the preferred implementation mode shown in the attached figures, the puncturing zone 20 is arranged at the base of the needle 120.

In practice, the puncturing zone 20 is an extension joined to the needle 120, the piercing element 12 equipped with the aforementioned needle and the aforementioned puncturing zone being made from a single piece by plastic molding.

Referring to the attached figures, the front yoke 11a and the piercing element 12 are configured in order to form, behind the puncturing zone 20, a recovery chamber 22 enabling recovery of the liquid flowing through the packaging envelope 4. This configuration enables injection of pressurized water into the capsule 1 and recovery of the beverage flowing from the aforementioned capsule from a common side of the machine 10, which can simplify the design of the machine and reduce its bulk.

Figure 4:
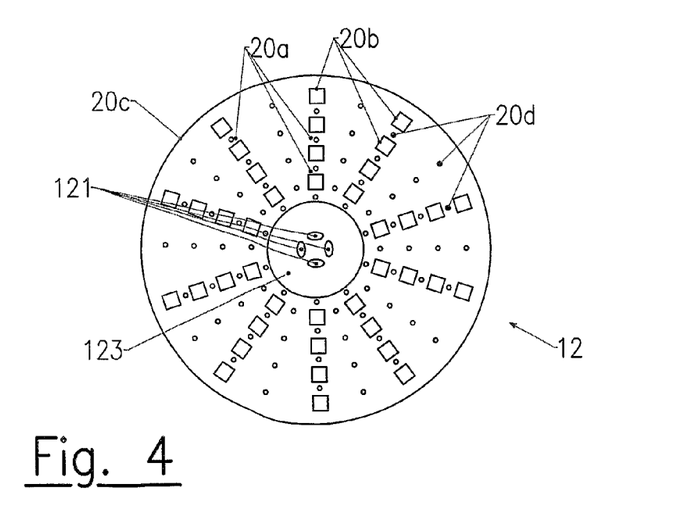
FIG. 4 is a front view of the piercing element, shown in FIG. 3, alone.

Referring to a first implementation mode shown in FIGS. 3 and 4, the puncturing zone 20 comprises a series of trough parts 20a and upper parts 20b configured so as to enable the puncturing of the packaging envelope 4 of the capsule 1 at the time of the injection of pressurized water. The upper parts 20b act as a punch and weaken the packaging envelope 4 at the time of the placement of the capsule 1 against the puncturing zone 20. Under the effect of the pressure, the part of the packaging envelope 4 thus weakened is adapted to burst. The vacuum, obtained by the difference in height between the trough parts 20a and the upper parts 20b, causes the puncture of the packaging envelope 4 under the effect of the pressure of the injected water.

Referring more particularly to FIG. 4, the puncturing zone 20 is formed by a molded grille 20c at the base of the needle 120. The grill 20c comprises orifices 20d communicating with the recovery chamber 22. The orifices 20d are arranged below the upper parts 20b in order to more easily enable recovery of the infused liquid. The orifices 20d have the shape of a cone frustum whose small base is arranged on the side of the puncturing zone 20 and whose large base is arranged on the side of the chamber 22. This configuration avoids the corking phenomena and creates a laminar flow that improves the quality of the beverage. The small base of the orifices 20d has a diameter between 0.1 mm and 0.3 mm in order to retain possible grains, of the substance to be infused 2, that are able to escape the capsule 1, the latter including a filtering envelope 3 or not.

Figure 6:
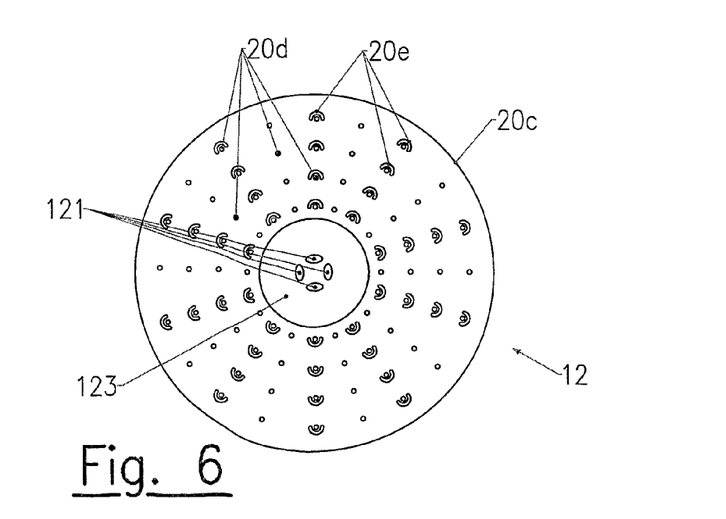

Referring to a second implementation mode shown in FIGS. 5 and 6, the puncturing zone 20 is equipped with means 20e for piercing the packaging envelope 4 of the capsule 1. Preferably, the means 20e for piercing the packaging envelope 4 are molded needles on a grill 20c. However, any other means of piercing convenient for the person of skill in the art can be employed. This implementation mode is particularly suited to spherical capsules whose packaging envelope 4 is not configured to burst at the time of the injection of pressurized water, when the aforementioned packaging envelope is made of plastic for example.

In the case where the capsule 1 comprises a filtering envelope 3, the means of piercing 20e are advantageously configured to pierce only the packaging envelope 4 and leave the aforementioned filtering envelope intact. In practice, needles having a length sufficient to pierce the packaging envelope 4 and possibly distort the aforementioned filtering envelope 3, but insufficient to pierce the latter, are used.

The grill 20c comprises orifices 20d communicating with the recovery chamber 22. The orifices 20d have the shape of a cone frustum whose small base is arranged on the side of the puncturing zone 20 and large base on the side of the chamber 22. This configuration enables avoidance of the corking phenomena and creates a laminar flow that improves the quality of the beverage. The small base of the orifices 20d has a diameter between 0.1 mm and 0.3 mm in order to retain possible grains, of the substance to be infused 2, that are able to escape the capsule 1, the latter including a filtering envelope 3 or not.

Referring to the attached figures, the puncturing zone 20 has a general plane shape so that the packaging envelope 4 is substantially distorted before the injection of pressurized water. This feature improves the punching of the packaging envelope 4 when the puncturing zone 20 comprises a series of trough parts 20a and upper parts 20b. It also optimizes the piercing of the packaging envelope 4 when the puncturing zone 20 comprises means of piecing 20e.

In an implementation variation not shown, the puncturing zone 20 can have the shape of a spherical cap configured to substantially match the shape of the capsule 1.

The needle 120 is advantageously configured to form sealing around the pierced edges of the packaging envelope 4 and prevent the infused liquid from flowing at the area of the aforementioned pierced edges. Referring to FIGS. 3 and 5, the needle 120 preferably comprises a flange 123 configured so that the pierced edges of the packaging envelope 4, and possibly those of the filtering envelope 3, come to be flattened above so as to be water impermeable under the effect of the pressure of the water injected into the capsule 1.

Referring to FIGS. 2a to 2e, the reservoir 13 is equipped with an opening 130 enabling conveyance of the capsules 1 to the infusion chamber 11. In standby position (FIG. 2a), the rear yoke 11b is retracted toward the rear of the frame 100 in order to free the opening 130 and load a capsule.

By actuating the lever 16, the rear yoke 11b comes into contact with the front yoke 11a, driving the capsule 1 to the needle 120 (FIG. 2b). By continuing to actuate the lever 16, the rear yoke 11b pushes the front yoke 11a and enables the needle 120 to pierce the packaging envelope 4 of the capsule 1 (FIG. 2c). The lever 16 is then locked. In this position, the capsule 1 is fully secured in the infusion chamber 11 and the packaging envelope 3 comes into contact with the puncturing zone 20. Hot pressurized water is then injected into the capsule 1 via the orifices 121 of the needle 120. The water injection is carried out under a pressure of 5 to 20 bar. Under the effect of the pressure, the packaging envelope 4 is pierced. The infused liquid then traverses the pierced part of the packaging envelope 4, passes through the grille 20c via orifices 20d and is recovered in chamber 22. Referring to FIG. 2c, the front yoke 11a comprises a conduit 21a arranged to create a communication between the recovery chamber 22 and the conduit 21 when the aforementioned front yoke is in retracted position. The liquid contained in the recovery chamber 22 can thus be conveyed through conduits 21a and 21, to a cup, bowl or any other suitable receptacle.

Once the beverage is extracted from the capsule 1, the lever 16 is actuated in reverse direction so as to retract the rear yoke 11b (FIG. 2d). At the time of the retraction of the latter, the spring 17 relaxes and restores the front yoke 11a to its forward position. The latter is moved while pushing the capsule 1 away from the needle 120.

By continuing to actuate the lever 16, the rear yoke 11b returns to its loading position, frees the opening 130 of the reservoir 13, and enables the loading of a new capsule in the infusion chamber 11 (FIG. 2a).

Referring to FIGS. 2a to 2e, the conduit 30 for evacuating the used capsule is housed in the frame 100 in order to enable recovery of the aforementioned capsule when the rear yoke 11b returns to standby position and the aforementioned capsule is extracted from the needle 120.

A closure element 31 arranged on the frame 100 is moveably mounted between a closed position blocking the access to the conduit 30 and an open position enabling access to the aforementioned conduit. The movement of the closure element 31 is advantageously synchronized with the movement of the rear yoke 11b. When the rear yoke 11b is in standby position (FIG. 2a), the closure element 31 blocks the conduit 30 so that the new capsule 1 cannot fall inside it. When the rear yoke 11b advances (FIGS. 2b and 2c), the closure element 31 retracts to a rear position so as to free access to the conduit 30. When the rear yoke 11b retracts to a position where it partially blocks the opening 130 of the reservoir 13 so that no capsule can fall into the infusion chamber 11, the closure element 31 advances up to an intermediate position not blocking the conduit 30 (FIG. 2e). In this configuration, the used capsule can fall into the conduit 30. When the rear yoke 11b continues to retract towards its loading position, the closure element 31 advances and blocks the conduit 30 (FIG. 2a).

The closure element is driven by a spur 32 coupled to a mechanism coupled to the rear yoke 11b so as to synchronize the movements. However, the closure element 31 can be coupled to a mechanism whose operation is independent of the movement of the rear yoke 11b.

Figure 7A:
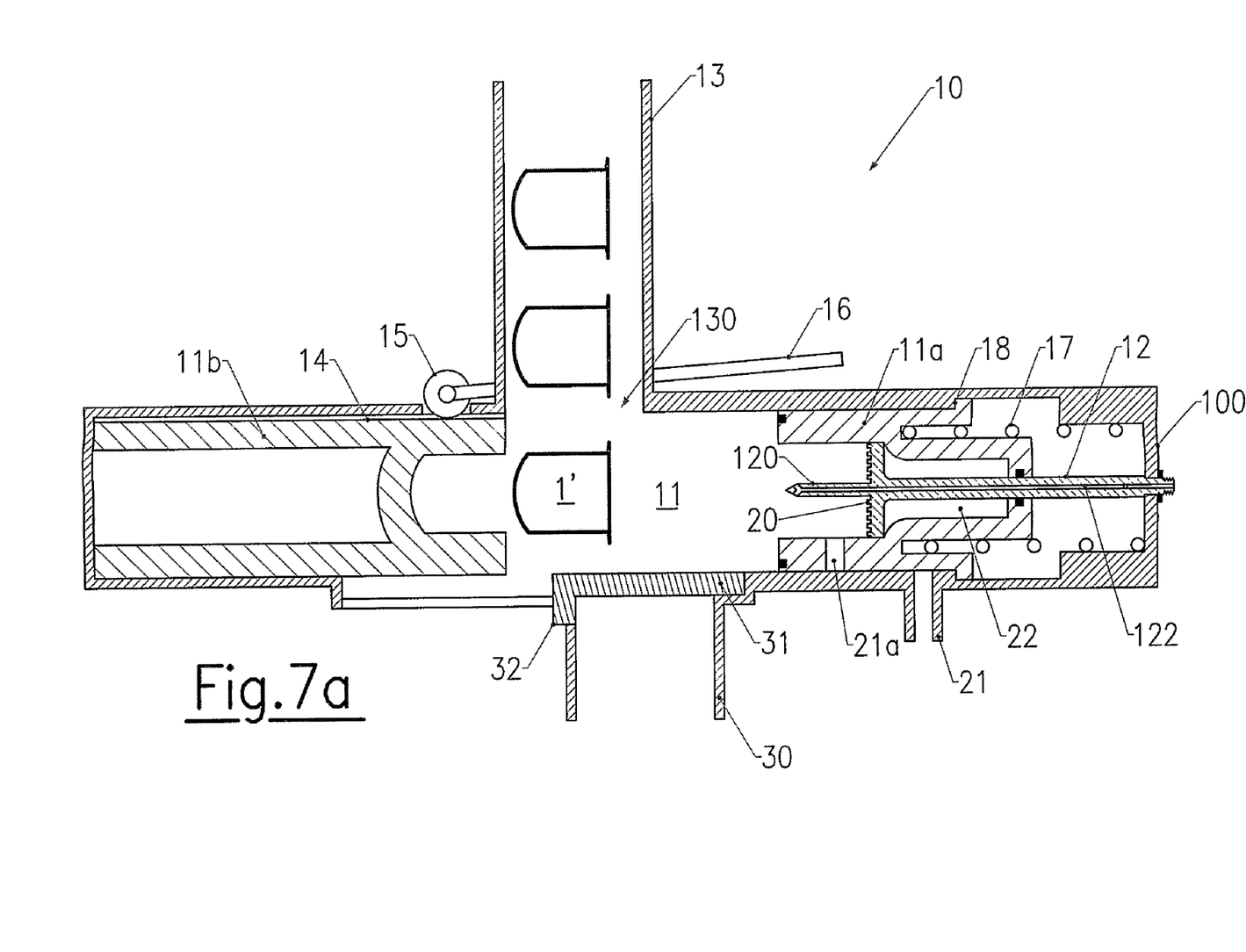
Figure 7B:
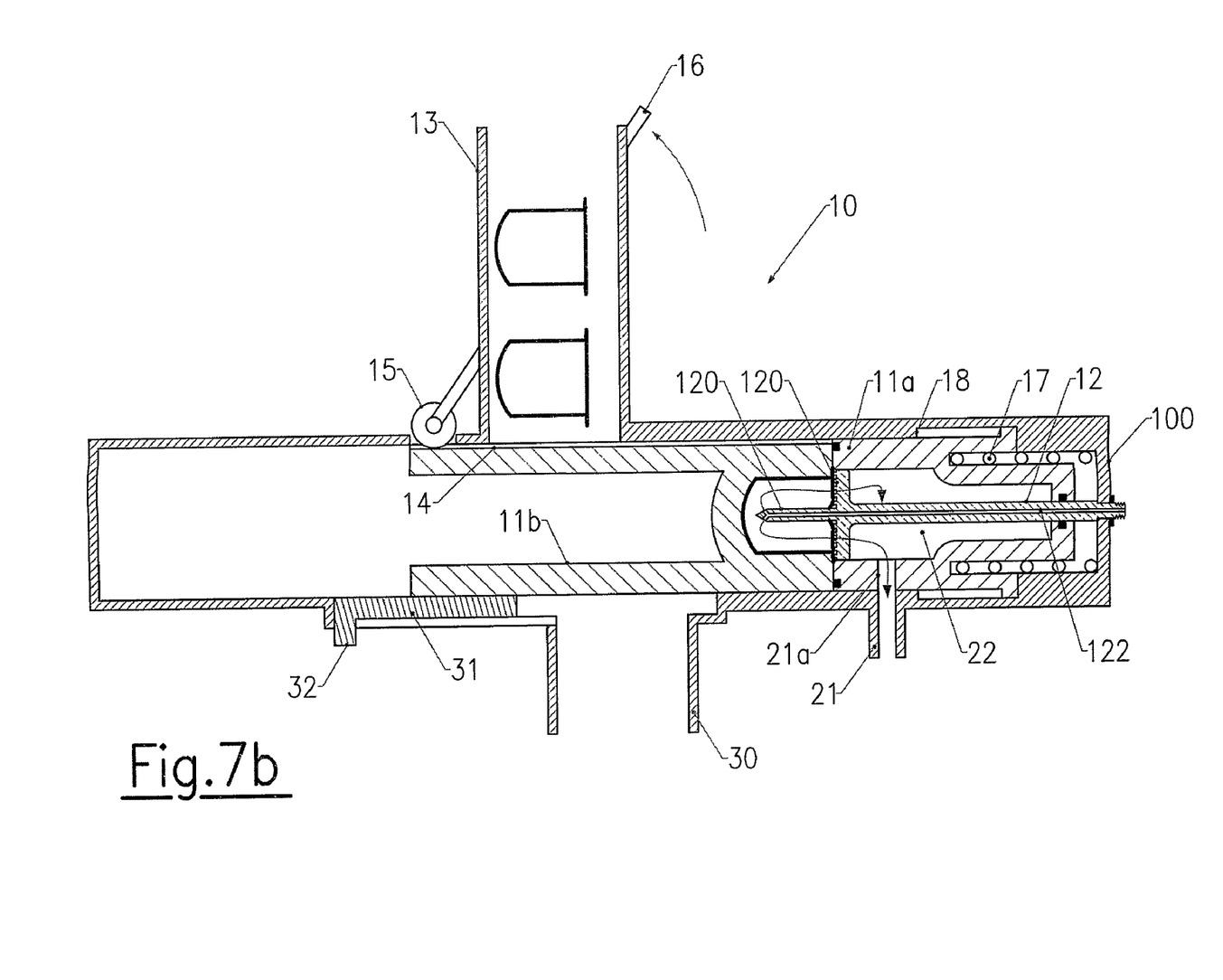

Referring to FIGS. 7a and 7b, the machine 10 can also comprise an infusion chamber 11 configured to receive a capsule 1' that is not spherical.

In particular, the infusion chamber 11 can be configured to receive a capsule of the type described in EP 0,554,469 (Nestle) having the shape of a cone frustum and having a weakness zone at the base of the aforementioned cone frustum. In this case, the front yoke 11a and rear yoke 11b have ends fitted to the shape and dimensions of the capsule 1'. In the same manner as described above, the piercing element 12 is positioned in the infusion chamber 11 in order to pierce the capsule 1' at the weakness zone provided at the base of the cone frustum of the aforementioned capsule.

The mode of operation of this machine is identical to that described above for spherical capsules. However, the reservoir 13 containing the capsules 1' will preferably have a section corresponding to the shape of the aforementioned capsules so that they are always positioned in the correct direction in the infusion chamber 11. To simplify the design, an appropriately shaped keyway can be provided only at the upper end of the reservoir 13.

The invention claimed is:

1. A machine for the automatic preparation and dispensing of beverages, the machine comprising:
    an infusion chamber configured to receive a capsule formed by a compacted aggregate of a substance to be infused held in an air and water impermeable packaging envelope, the infusion chamber including a first side, and a second side opposite the first side, a cross-section of the second side defining an arc configured to be flush with a capsule having spherical shape;
    a projection for piercing the packaging envelope, to penetrate into the aggregate of a substance to be infused, and inject pressurized water into the capsule under a pressure of 5 to 20 bar; and
    a puncturing zone configured to act as a punch and weaken the packaging envelope at the time of placement of the capsule against the puncturing zone and, subsequently, to locally burst or pierce the packaging envelope as a result of injection of pressurized water into the capsule, the puncturing zone communicating with a device to recover the liquid flowing through the punctured or pierced part of the packaging envelope, characterized by the fact that the puncturing zone is arranged on the first side of the the infusion chamber and the piercing projection is arranged on the first side of the infusion chamber, the puncturing zone being arranged at the base of the piercing projection, joined to the latter, the water being injected into the part of the capsule opposed to the puncturing zone so that it can be uniformly distributed throughout the capsule, the puncturing zone including a first part having a first distance from the second side of the infusion chamber, and a second part having a second distance from the second side of the infusion chamber, the first distance being greater than the second distance, the puncturing zone defining a plurality of through-passages in the first part of the puncturing zone, the through-passages being in fluid communication with the device to recover the liquid.

2. A machine according to claim 1, wherein the puncturing zone constitutes a grill, and the second part of the puncturing zone includes molded needles.

3. A machine according to claim 2, wherein the through-passages have the shape of a cone frustum having a first width and a second width larger than the first width, the second width being downstream from the first width.

4. A machine according to claim 1, wherein the piercing projection comprises a needle adapted to pierce the packaging envelope of the capsule, the needle defining a water injection orifice in fluid communication with a conduit for pressurized water.

5. A machine according to claim 4, wherein the puncturing zone is arranged at the base of the needle.

6. A machine according to claim 4 wherein the puncturing zone is formed by a molded grill at the base of the needle.

7. A machine according to claim 6, wherein the through-passages have the shape of a cone frustum having a first width and a second width larger than the first width, the second width being downstream from the first width.

8. A machine according to claim 1, wherein the infusion chamber is formed by a front yoke and a rear yoke, the rear yoke being moveably mounted between a loading position enabling placement of the capsule in the infusion chamber and a closed position where the rear yoke is positioned with the front yoke so as to hold the capsule.

9. A machine according to claim 8 wherein the puncturing zone is arranged at the base of the needle and wherein the front yoke and the piercing projection are configured so as to form, behind the puncturing zone, a recovery chamber to enable recovery of the liquid flowing through the packaging envelope.

10. A machine according to claim 4 wherein the infusion chamber is formed by a front yoke and a rear yoke, the rear yoke being moveably mounted between a loading position enabling placement of the capsule in the infusion chamber and a closed position where the rear yoke is positioned with the front yoke so as to hold the capsule and wherein the front yoke and the piercing projection are arranged to be in a position enabling skewering the capsule on the needle and a position enabling the extraction of the capsule away from the needle.

11. A machine according to claim 1 wherein the piercing projection comprises a needle adapted to pierce the packaging envelope of the capsule, the needle defining a water injection orifice in fluid communication with a conduit for pressurized water and wherein the needle comprises a flange configured so that the pierced edges of the packaging envelope have been flattened above so as to be water impermeable under the effect of the pressure of the water injected into the capsule.

12. A machine according to claim 1, wherein the machine comprises a reservoir for storage of multiple capsules equipped with an opening enabling conveyance of the capsules to the infusion chamber.

13. A machine according claim 1, further including a conduit for evacuating the used capsules.

14. A machine according to claim 13 wherein the infusion chamber is formed by a front yoke and a rear yoke, the rear yoke being moveably mounted between a loading position enabling placement of the capsule in the infusion chamber and a closed position where the rear yoke is positioned with the front yoke so as to hold the capsule and wherein a closure element is arranged with the conduit to evacuate the infused capsules, the closing element being moveably mounted between a closed position shutting access to the conduit and an open position allowing access to the conduit, the movement of the closure element being synchronized with the movement of the rear yoke.

15. A machine according to claim 1 further including a yoke configured to move the capsule into the piercing projection, thereby causing the piercing projection to skewer the capsule.

16. A machine according to claim 1 further including a yoke configured to move the capsule into the piercing projection, thereby causing the piercing projection to skewer the capsule, the piercing projection being in a fixed position relative to the infusion chamber when the yoke moves the capsule into the piercing projection.

* * * * *